June 7, 1960 W. F. STEAGALL 2,940,066

BISTABLE DEVICE

Filed Oct. 11, 1955 3 Sheets-Sheet 1

INVENTOR.
WILLIAM F. STEAGALL

BY

Charles C. English
AGENT

June 7, 1960 W. F. STEAGALL 2,940,066

BISTABLE DEVICE

Filed Oct. 11, 1955 3 Sheets-Sheet 2

INVENTOR.
WILLIAM F. STEAGALL
BY
Charles C. English
AGENT

June 7, 1960 W. F. STEAGALL 2,940,066

BISTABLE DEVICE

Filed Oct. 11, 1955 3 Sheets-Sheet 3

INVENTOR.
WILLIAM F. STEAGALL
BY Charles C. Enfield
AGENT

United States Patent Office 2,940,066

Patented June 7, 1960

2,940,066

BISTABLE DEVICE

William F. Steagall, Merchantville, N.J., assignor to Sperry Rand Corporation, New York, N.Y., a corporation of Delaware Filed Oct. 11, 1955, Ser. No. 539,734

12 Claims. (Cl. 340—174)

The present invention relates to bistable devices, and is more particularly concerned with an improved bistable device in the nature of a binary counter or flip-flop utilizing interconnected amplifiers, for instance of the magnetic type.

Reference is made to my prior Patent No. 2,709,798, issued May 31, 1955, for: "Bistable Devices Utilizing Magnetic Amplifiers" which teaches a form of bistable magnetic amplifier employing three interconnected amplifiers in combination with one or more gates. The particular forms of bistable devices taught in the said prior patent are characterized by a pair of complementing amplifiers connected 'head-to-tail" whereby the output of one of the said amplifiers is fed back as an input to the other, maintaining the other of the said amplifiers in a non-output producing state. Bistable operation is effected by causing a preselected one of the said pair of amplifiers to assume an output producing state thereby to inhibit an output from the other amplifier of said pair, whereby the two bistable states of the system are characterized by outputs from one or the other of said amplifiers. The device is caused to selectively shift from one to another of its bistable states under the control of a third amplifier coupled to the input of one of said pair of interconnected amplifiers, and this third amplifier is in turn controlled by input signals selectively coupled to the said third amplifier via a gating device.

While this described form of bistable device operates quite efficiently, it is characterized in its structure by the provision of a gate and this structural characteristic is in fact to be found in the great majority of bistable devices known at the present time. The present invention provides an improved bistable device which need not employ such gates whereby less power is required of the input signal source for proper operation of the system and whereby the overall bistable circuit utilizes fewer components, thereby effecting a less expensive structure.

In operation, the bistable device of the present invention is somewhat analogous to the operation described above, and taught more completely in my prior Patent No. 2,709,798; and this prior patent is accordingly incorporated herein by reference. By modifying the form of amplifier employed, however, the present invention is distinguished from the said prior patent by the elimination of gates and by the attendant decrease in required signal power and in overall cost, as described above.

It is accordingly an object of the present invention to provide an improved bistable device.

A further object of the present invention resides in the provision of improved bistable devices in the nature of binary counters or flip-flops utilizing magnetic amplifiers.

A still further object of the present invention resides in the provision of a bistable device requiring less power from a signal source for proper operation of the system than has been the case heretofore.

Still another object of the present invention resides in the provision of an improved bistable device which need not employ gate structures.

Another object of the present invention resides in the provision of a bistable device which comprises fewer parts and which is less expensive than analogous bistable devices known heretofore.

In providing for the foregoing objects and advantages, the present invention once more contemplates the provision of a pair of amplifiers connected head-to-tail, and of a third amplifier coupled to the input of one of said pair of amplifiers thereby to selectively effect a change in the bistable conditions of said pair of amplifiers. The said pair of amplifiers, as described in my prior patent, exhibit complementing outputs; but in accordance with the present invention, at least one of the said amplifiers is so modified that it produces a direct or non-complementing output in addition to its said complementing output. This direct output is in turn coupled to an inhibition terminal in the said third amplifier thereby to selectively inhibit outputs therefrom. By so providing an inhibition input to the said third amplifier, the necessity of a separate gating device is eliminated whereby the improved operational characteristics and advantages described above are effected.

The foregoing objects, advantages, construction and operation of the present invention will become more readily apparent from the following description and accompanying drawings, in which.

As discussed above, the bistable device of the present invention eliminates the necessity of gates through the provision of a modified magnetic amplifier capable of producing both complement and direct outputs. The complement output performs its normal function as described in my Patent No. 2,709,798, and selectively inhibits the output of a further complementing amplifier, while the direct output of my modified amplifier serves to selectively inhibit outputs from a third amplifier of the non-complementing type.

Figure 1:
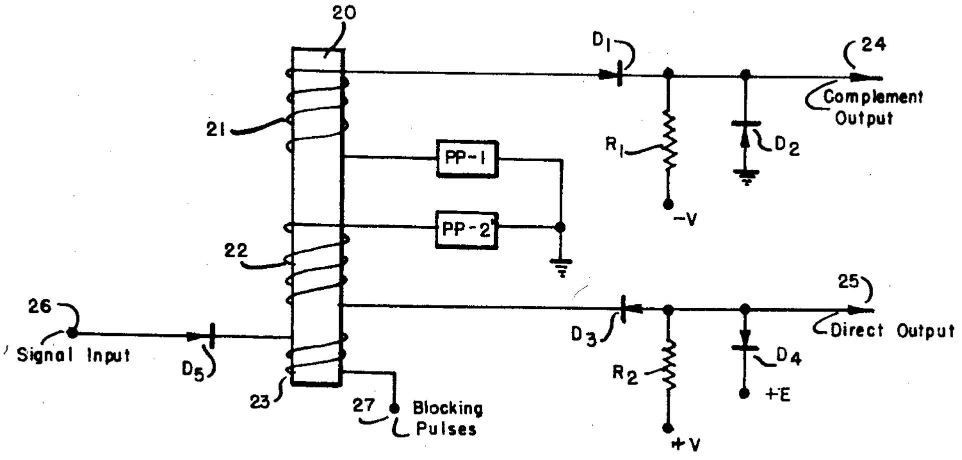
Figure 1 is a schematic diagram of a magnetic amplifier constructed in accordance with a preferred embodiment of the present invention and providing both direct and complement outputs.

Before proceeding with a detailed discussion of the overall bistable device, it will be helpful to consider the actual structure and operation of a modified magnetic amplifier providing both direct and complement outputs, as described; and one such amplifier is illustrated, for instance in Figure 1. Thus, referring to Figure 1, it will be seen that in accordance with the present invention, a magnetic amplifier may comprise a core 20 of magnetic material preferably but not necessarily exhibiting a substantially rectangular hysteresis loop; and the said core 20 carries a first output winding 21, a second output winding 22 and an input winding 23 thereon. Output winding 21 is coupled at one of its end to a source of regularly occurring power pulses PP-1 (Figure 2A); and is coupled at the other of its ends via a rectifier D1 to an output point 24. The said output point 24 is selectively clamped at ground potential by a sneak supressor R1—D2 operating in the manner described in my Patent No. 2,709,798. Output winding 22 is also coupled at one of its ends to a source of regularly occurring energization pulses PP–2′ (Figure 2B); and is coupled at the other of its ends via a rectifier D3 to an output point 25 which is selectively clamped at +E potential by a further clamp circuit comprising a rectifier D4 and a resistor R2 coupled to a source +V, as indicated. Input winding 23 is coupled at one of its ends via a rectifier D5 to a source of signal inputs 26 (Figure 2D); and is coupled at the other of its ends to a source 27 of blocking pulses (Figure 2C).

Figure 2:
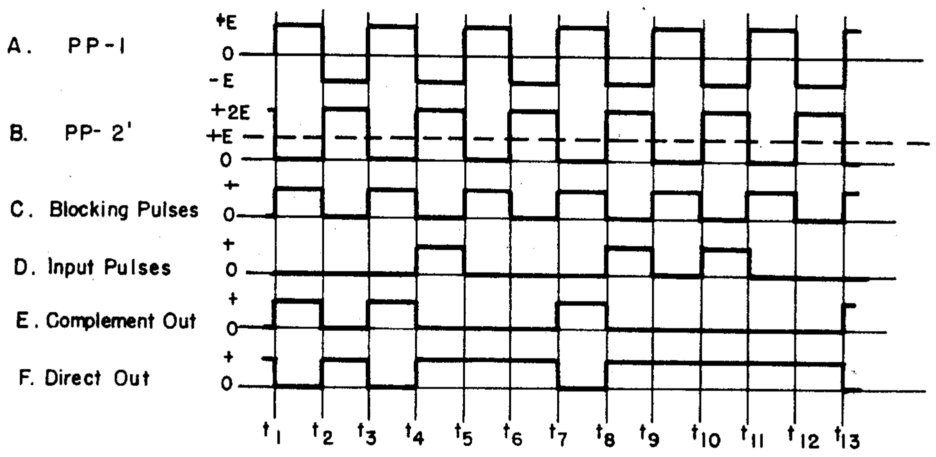
Figure 2 (A through F) are waveforms illustrating the operation of the circuit shown in Figure 1.

As illustrated in Figure 2A the source PP–1 exhibits regularly occurring positive and negative going excursions of potential about ground and between upper and lower limits of +E and −E. The source PP–2′ also exhibits regularly occurring positive and negative going excursions of potential balanced about a level of +E and between upper and lower limits of +2E and ground respectively. As has been discussed in my prior Patent No. 2,709,798, the notations "Phase 1" and "Phase 2" power pulses merely indicate that a positive-going portion of a phase 1 power pulse, for instance, occurs during the same time period as a negative-going portion of a phase 2 power pulse, and vice versa. Similarly, an "unprimed" phase notation for a power pulse is meant to indicate a power pulse of a given phase balanced about ground potential; while a "primed" power pulse notation is meant to indicate a power pulse of a given phase balanced about a +E potential, whereby in an overall circuit the bistable device of the present invention employs phase 1, phase 2, phase 1′ and phase 2′ power pulses.

Returning now to the circuit of Figure 1, and referring to the discussion in my Patent No. 2,709,798, it will be appreciated that the output windings 21 and 22 exhibit relatively high impedance values when the core 20 is caused to operate over unsaturated portions of its hysteresis loop; and the said output windings 21 and 22 exhibit relatively low impedance values when the core is caused to operate over saturated portions of its hysteresis loop. The core 20 is caused to operate over either a saturated or an unsaturated portion of its hysteresis loop under the control of input pulses selectively applied from source 26 to the input winding 23, and these input pulses therefore determine the effective impedances of the windings 21 and 22, and, in turn, determine the output states at terminals 24 and 25.

If we should initially assume that the core 20 is at its plus remanence operating point, it will be observed that during a time interval $t1$ to $t2$, the phase 1 power pulse applied to winding 21 goes to a value +E, while the phase 2′ power pulse assumes a value of substantially ground potential. During the time interval $t1$ to $t2$, therefore, the phase 1 power pulse from source PP–1 drives core 20 into positive saturation whereby each of windings 21 and 22 exhibits a relatively low impedance. Accordingly, current passes from source PP–1 through winding 21, and thence via rectifier D1 whereby an output pulse appears at terminal 24 (Figure 2E) during time interval $t1$ to $t2$. During this same time interval $t1$ to $t2$, and inasmuch as the source PP–2′ goes to ground potential, current is drawn from the source +V via resistor R2 and rectifier D3 to ground whereby the direct output point 25 falls substantially to ground potential.

During a time interval $t2$ to $t3$, the PP–1 source assumes a −E potential, while source PP–2′ assumes a +2E potential. During this time interval, therefore, each of rectifiers D1 and D3 will be disconnected whereby output point 24 exhibits its clamped ground potential while output point 25 exhibits its clamped +E potential. During a next subsequent time interval $t3$ to $t4$, a sequence of events occurs analogous to that occurring during time interval $t2$ to $t3$ whereby the complement output point 24 rises to a positive potential while the direct output point 25 falls to substantially ground potential.

If now during a time interval $t4$ to $t5$, a signal input pulse should be applied from source 26 (Figure 2D), a current will be caused to flow in winding 23 to the blocking pulse source 27 (which is during this time interval substantially at ground potential), thereby flipping the core 20 from plus remanence to its minus remanence operating point. It should be noted, in passing, that the "primed" power pulse source PP–2′ exhibits a positive-going excursion to a value +2E, thereby to assure that rectifier D3 will be cut off during the application of such an input pulse from source 26. During the next subsequent time interval $t5$ to $t6$, therefore, the applied positive-going pulse from source PP–1 will find winding 21 to exhibit a relatively high impedance whereby substantially no output appears at complement output point 24. The current flowing in winding 21 under the drive of source PP–1, during the time interval $t5$ to $t6$, thus serves merely to flip the core from minus remanence to its plus remanence operating point, and this current flow in winding 21 also acts to induce a voltage in winding 22 of proper polarity and magnitude to disconnect rectifier D3. Thus, during the time interval $t5$ to $t6$, and inasmuch as rectifier D3 is disconnected, the direct output point 25 will remain at its +E potential, as determined by clamp R2—D4.

To summarize the foregoing operation, and referring particularly to the waveforms of Figures 2D through 2F, it will be seen that in the absence of an input pulse, positive-going pulses appear at the complement output point 24 and no output pulses appear at the direct output 25 during the output time intervals $t1$ to $t2$, $t3$ to $t4$, etc. In response to a signal input from source 26, however, no output pulse appears at complement output point 24 and a +E pulse appears at the direct output point 25 during an output time interval such as $t5$ to $t6$. The output at terminal 24 thus corresponds to the complement of the signal state from source 26, while the output at terminal 25 follows the signal state of source 26. A still further sequence of operation is illustrated for the time intervals $t8$ to $t13$ corresponding to the application of two successive input pulses from source 26.

Figure 3:
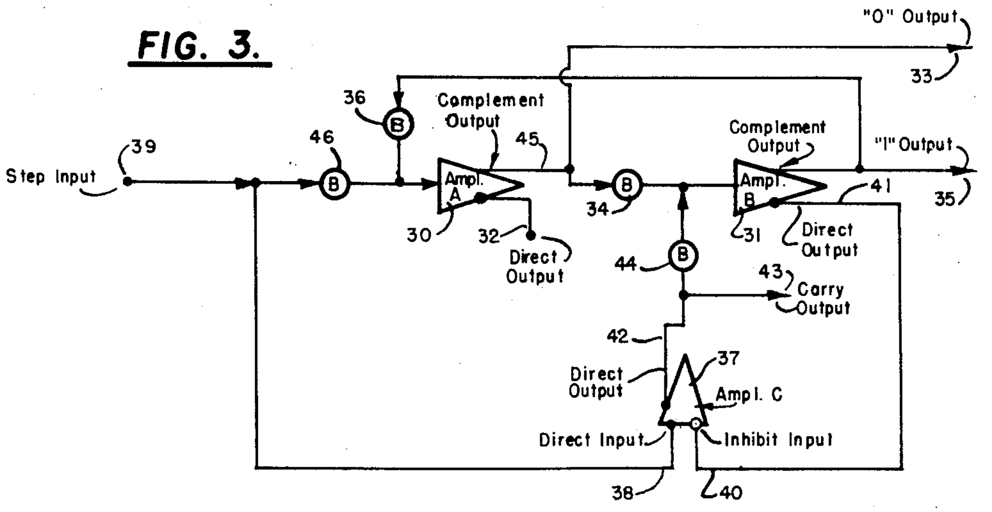
Figure 3 is a logical diagram of an improved bistable device constructed in accordance with the present invention.

Amplifiers such as that illustrated and described in reference to Figure 1, may be employed in a bistable circuit to effect the desired bistability of operation without the necessity of providing gates. Referring to Figure 3, it will be seen that such a bistable device in logical representation may comprise a first amplifier 30 termed "amplifier A," and a second amplifier 31 termed "amplifier B," the said amplifiers 30 and 31 being connected head-to-tail via their signal input points and complement output points. Amplifier 31 may correspond to an amplifier such as that illustrated in Figure 1 inasmuch as both the direct and complement outputs are utilized in the operation of the circuit. The amplifier 30, while illustrated as providing a direct output for instance at 32, actually may take the form of a substantially conventional complementing amplifier of the type illustrated in my prior Patent No. 2,709,798, and the modified amplifier of Figure 1 may be employed as amplifier 30 only when it is desired to provide an additional output point such as 32.

Due to the head-to-tail interconnection of the amplifiers 30 and 31, complement outputs from amplifier 30, appearing for instance at the "0" output point 33, are fed via buffer 34 to the input of amplifier 31 thereby to inhibit complement outputs from amplifier 31 whereby no pulses appear at the "1" output point 35. If amplifier 31 should be caused to assume an output producing state whereby pulses do appear at the "1" output point 35, these pulses are also fed via buffer 36 to the input of amplifier 30 inhibiting complement outputs from appearing at the "0" output point 33 or from being fed via buffer 34 to the input of amplifier 31. Thus, when one of the amplifiers 30 or 31 is in an output producing state, the output pulses produced thereby serve to inhibit complement outputs from the other of the said amplifiers; and this particular operation in respect to the possible bistable outputs of the complementing portions of amplifiers 30 and 31 conforms to the operation described in my Patent No. 2,709,798 wherein a pair of conventional complementing amplifiers were employed in the illustrated head-to-tail interconnection.

A shift in bistable output condition is selectively controlled by a third amplifier 37 termed "amplifier C," which amplifier 37 has a direct input point 38 connected to a source of step input pulses 39. The amplifier 37 also has an inhibit input point 40 connected to the direct output point 41 of amplifier 31, and the direct output 42 of amplifier 37 is coupled to a carry output point 43 and is also coupled via a buffer 44 to the input of amplifier 31.

The operation of the circuit illustrated in Figure 3 will become readily apparent by assuming that amplifier 30 initially produces output pulses at its complement output point 45. These complement output pulses appearing at terminal 45 are fed via buffer 34 to the input of amplifier 31 whereby the complement output of amplifier 31 is inhibited and no output pulses appear at the "1" output point 35. Inasmuch as pulses are being fed via buffer 34 to the input of amplifier 31, however, direct output pulses do appear at the direct output point 41 and these direct output pulses are fed to the amplifier 37 at its inhibit input terminal 40 thereby to assure that amplifier 37 cannot produce an output. If now a first step input pulse should be applied to terminal 39, this input pulse is fed via a buffer 46 to the input of amplifier 30 and is also fed to the direct input terminal 38 of amplifier 37. The portion of the step input fed via buffer 46 inhibits complement outputs from amplifier 30 whereby no pulse appears at the "0" output terminal 33 and no pulse is fed via buffer 34 to the input of amplifier 31. That portion of the step input which is applied to the direct input terminal 38 of amplifier 37 would normally tend to produce a direct output from amplifier 37 at point 42 but such a direct output from amplifier 37 is inhibited by the application of pulses to the inhibit input terminal 40. Thus, this first step input pulse acts to stop complement outputs from amplifier 30 whereby amplifier 31 starts producing complement output pulses appearing at the "1" output point 35, and the said amplifier 31 stops producing direct output pulses appearing at the terminal 41 whereby inhibition is removed from the amplifier 37.

A second step input pulse applied to terminal 39 is once more coupled via buffer 46 to the input of amplifier 30, but has no effect on the operation of amplifier 30 inasmuch as it is merely cumulative to complement output pulses from amplifier 31 which are being fed via buffer 36 to the said input of amplifier 30. Such a second step input from source 39 is effective, however, in producing a direct output at terminal 42 of amplifier 37 inasmuch as the said amplifier 37 is no longer inhibited, and this direct output appearing at terminal 42 is coupled via buffer 44 to the input of amplifier 31 to inhibit complement outputs therefrom, whereby the system reverts to its original stable state.

Summarizing the foregoing operation, it will be seen that prior to a first step input, amplifier 30 which acts as a signal responsive pulse source for amplifier 31 produces complement outputs at terminal 33, while amplifier 31 produces no complement outputs at terminal 35 but does produce direct outputs which inhibit the operation of amplifier 37. Amplifier 37 is also acting as a signal responsive pulse source for amplifier 31. A first step input pulse inhibits the complement output from amplifier 30 whereby no pulses appear at terminal 33, and this lack of complement outputs from amplifier 30 permits amplifier 31 to commence producing complement outputs at terminal 35 and also serves to remove inhibition from the amplifier 37. A second step input pulse thereafter causes the now uninhibited amplifier 37 to produce an output which appears at the carry output point 43 and which inhibits complement outputs from amplifier 31, whereby no output pulses appear at the output point 35 and complement outputs once more commence appearing at the point 33 from amplifier 30.

Figure 4:
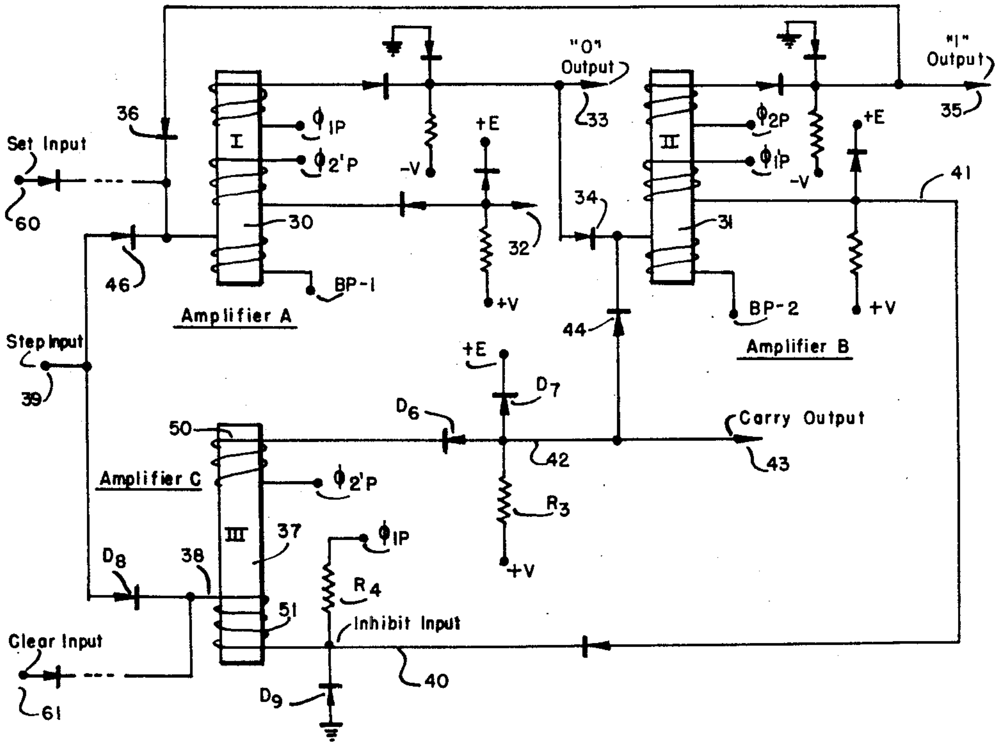
Figure 4 is a schematic diagram of a bistable device corresponding to the logic of the circuit illustrated in Figure 3.
Figure 5:
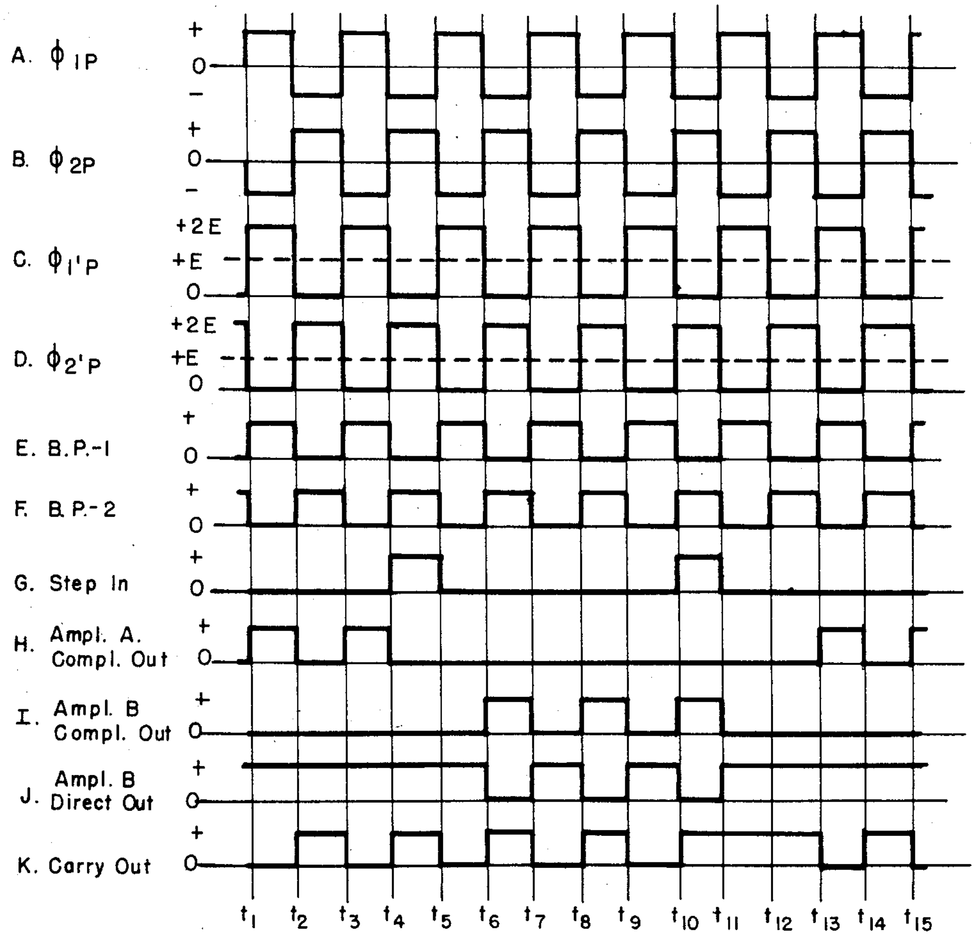
Figure 5 (A through K) are waveform diagrams illustrative of the operation of the circuits shown in Figures 3 and 4.

This structure and operation will be more readily seen by an examination of the schematic illustrated in Figure 4, and by reference to the waveforms of Figure 5. Referring to Figure 4 it will be seen that the amplifier A may take the form illustrated by the core I carrying the several windings illustrated and coupled to the indicated sources of power pulses and blocking pulses. Amplifier B may take the form illustrated by the core II, again carrying the several windings illustrated and coupled to the identified sources of power pulses and blocking pulses. Amplifier C may take the form illustrated by the core III and its associated windings. The several buffers and input and output points, as well as the other components corresponding to those already described in reference to Figure 3, have been identified by like numerals in Figure 4.

The amplifier having core I is illustrated as taking the form described in reference to Figure 1, but as mentioned previously, this amplifier may take the form of a substantially conventional complementing amplifier, for instance of the type described in my Patent No. 2,709,798. The amplifier having core II again corresponds to the amplifier described in reference to Figure 1 and both the complement outputs appearing at 35 and the direct outputs appearing at 41 are employed in the manner described above. The amplifier using core III may also take the form illustrated in Figure 1, if it is desired to provide an additional output point. In the particular operation of the device, however, the said amplifier utilizing core III need produce only direct output pulses which are selectively inhibited by direct outputs of the amplifier utilizing core II; and therefore amplifier 37 of Figure 4 has been illustrated as providing such a direct output only.

Before proceeding with a detailed discussion of the circuit shown in Figure 4, attention should be given to the particular form of inhibition employed in the amplifier 37 (having core III). This particular amplifier carries an output winding 50 coupled at one of its ends to a source of power pulses having a phase 2′ and coupled at the other of its ends via a rectifier D6 to a carry output point 43 which is selectively clamped at +E by the clamp R3—D7. The amplifier 37 also carries an input winding 51 coupled at one of its ends via a rectifier D8 to the step input point 39 and coupled at the other of its ends to a network comprising rectifier D9 connected as shown to ground, and a resistance R4 connected as shown to a source of phase 1 power pulses.

In operation, the network R4—D9 acts in the nature of a blocking pulse source in that no inputs may be applied to winding 51 during those time intervals when the phase 1 power pulse source is positive; and inputs may be applied to the said winding 51 only when the phase 1 power pulse goes negative thereby to render rectifier D9 conductive so that the lower end of winding 51 is substantially at ground potential. If, during the time intervals that the phase 1 power pulse source is negative, however, a positive-going direct output should appear from the terminal 41 of amplifier 31, which positive-going direct output is coupled to the junction of rectifier D9 and resistor R4, this positive-going output maintains the lower end of winding 51 at a positive potential whereby the said winding 51 cannot accept inputs from the step input source 39. Thus, the arrangement shown effectively provides selective inhibition of the amplifier 37 in that when there is a direct output from amplifier 31, no input may be coupled to the said amplifier 37.

The operation of the circuit shown in Figure 4 and already described in reference to Figure 3, is illustrated for an assumed sequence of input pulses in Figure 5. Figures 5A through 5F inclusive illustrate the waveforms of the several power pulse and blocking pulse sources which are employed in the system, and the points at which these pulses are applied are indicated in Figure 4. For such power pulses and blocking pulses it will be seen that amplifier A produces complement pulse outputs during the time intervals $t1$ to $t2$ and $t3$ to $t4$ for instance (Figure 5H), whereby amplifier B produces no complement outputs during the time intervals *t2* to *t3* and *t4* to *t5*, but does produce direct outputs during these time intervals *t2* to *t3* and *t4* to *t5* (Figures 5I and 5J). The output periods for amplifier 37 correspond to the time intervals *t1* to *t2*, *t3* to *t4*, etc.; and during these intervals it will be seen that the said amplifier 37 produces no carry output and that such a carry output is in fact positively inhibited by the amplifier B direct output.

If now, during a time interval *t4* to *t5*, a first step input pulse should be applied at the terminal 39, this step input pulse inhibits a complement output from amplifier A during the time interval *t5* to *t6* whereby amplifier B commences producing complement outputs during the time interval *t6* to *t7* for instance; and stops producing direct outputs during the time interval *t6* to *t7* for instance. The complement output produced by amplifier B during the time interval *t6* to *t7* is fed via buffer 36 to the input of amplifier A thereby assuring that the said amplifier A produces no complement output during the time interval *t7* to *t8*; and as a result, amplifier B once more produces a complement output during the time interval *t8* to *t9*. Thus, the first stable state of the system, characterized by complement outputs from amplifier A, has been replaced by a second stable state characterized by complement outputs from amplifier B.

Inasmuch as amplifier B no longer produces direct outputs during the time intervals *t6* to *t7*, *t8* to *t9*, etc. in this second stable state of the system, no inhibition input is applied to amplifier 37 during the time interval *t10* to *t11*, for instance. If, therefore, during this time interval, *t10* to *t11*, a second step input pulse should be applied to terminal 39 (Figure 5G), this second step input pulse will cause the amplifier 37 to produce a carry output during the time interval *t11* to *t12* (Figure 5K), and this carry output may be taken at terminal 43 and will also be fed via buffer 44 to the input of amplifier 31 thereby causing the system to revert to its first stable state.

The overall operation of the system will be seen to produce a single carry output (Figure 5K) for each pair of step inputs (Figure 5G), whereby the system may be utilized as a binary counter. The two possible outputs 33 and 35 may also be utilized to provide flip-flop outputs. Also it should be noted that the particular system shown in Figure 4 may be modified in a manner analogous to those modifications described in my Patent No. 2,709,798 and in particular, binary counters of the type shown in Figure 4 may be cascaded by connecting the carry output 43 of each such binary counter to the step input 39 of the next subsequent binary counter.

If desired, auxiliary inputs may be applied to the system (see Figure 4); and these auxiliary inputs may comprise for instance a set input such as 60 applied directly to the input of amplifier 30 and a clear input such as 61 applied directly to the input of amplifier 37. The application of a set input such as 60 will inhibit outputs from amplifier 30 thereby assuring that "1" output pulses appear at terminal 35 regardless of the previous state of the system. Similarly, a clear input such as 61 will effect a direct output from amplifier 37 regardless of the prior state of the system (provided the potential magnitude of clear input 61 is sufficiently large), thereby assuring an output from amplifier 37 which inhibits a complement output from amplifier 31 and assures that a clear output is effected, characterized by "0" output pulses at the terminal 33.

Still further modifications will be suggested to those skilled in the art, and certain of these modifications have already been discussed. It should be noted that the particular forms of magnetic amplifiers illustrated are meant to be illustrative only and that other forms of amplifiers of both the magnetic and non-magnetic type, may be employed provided the required direct and complement outputs are supplied and the desired inhibition input is also supplied. Even further modifications will be suggested to those skilled in the art; and it must therefore be stressed that the foregoing discussion is meant to be illustrative only and should not be considered limitative of my invention. All such modifications as are in accord with the principles described are meant to fall within the scope of the appended claims.

Having thus described my invention, I claim:

1. A bistable device comprising first and second amplifiers, each of which has an input and a complementing output, at least said second amplifier also having a direct output, means connecting the complementing output of each of said amplifiers to the input of the other of said amplifiers, a third amplifier having a signal input, an inhibition input and an output, means coupling the output of said third amplifier to the input of said second amplifier, a source of control signals, means for selectively coupling said source of control signals to the signal input of said third amplifier, and means coupling the said direct output of said second amplifier to said inhibition input of said third amplifier thereby to render said third amplifier selectively unresponsive to signals from said source of control signals.

2. The device of claim 1 wherein each of said first, second and third amplifiers comprises a pulse type magnetic amplifier.

3. The device of claim 1 wherein the output of said third amplifier is coupled to the input of said second amplifier, said second amplifier including said direct output coupled to said third amplifier, said control signals being simultaneously coupled to the inputs of said first and third amplifiers.

4. A bistable device comprising first and second magnetic amplifiers, each of said amplifiers having an input and a complementing output and at least said second amplifier also having a direct output, means coupling the complementing output of each of said amplifiers to the input of the other of said amplifiers, a third magnetic amplifier comprising a core of magnetic material capable of exhibiting stable remanence conditions and having input winding means thereon, said third amplifier having a direct output coupled to the input of said second amplifier, a source of control signals means selectively coupling said source of control signals to one end of the input winding means of said third amplifier, and means coupling said direct output of said second amplifier to the other end of said input winding means of said third amplifier thereby selectively to inhibit outputs from said third amplifier.

5. In combination, an amplifier having an input and also having both direct and complement outputs, a first source of control signals having an input and output, said first source being responsive to the signals in said first source input to produce signals in said first source output, a second source of control signals having an input and an output thereto, said second source being operable to inhibit the production of signals in the output of said second source in response to signals in said second source input, means coupling said amplifier direct output to said first source input, and means coupling said amplifier complement output to said input of said second source thereby to control the application of signals to said amplifier input.

6. The device of claim 5 wherein said amplifier comprises a pulse type magnetic amplifier.

7. A control device comprising a control signal input terminal, a magnetic amplifier having an input and also having both direct and complement outputs, a first pulse source having an input connected to said input terminal and having a complement output coupled to said input of said amplifier, a second pulse source responsive to both a first input from said input terminal and a second input to produce a non-complement output in response to said first input unless said output is inhibited by said second input, means coupling the complement output of said amplifier to said input of said first pulse source and means coupling the direct output of said amplifier to said second input of said second pulse source whereby the input to said amplifier is controlled by both the control signals received by said input terminal and the output of said second pulse source.

8. A magnetic amplifier comprising a core of magnetic material capable of assuming stable remanence conditions, an input winding on said core, first and second output windings on said core, a first source of spaced energization pulses coupled to one end of said first output winding, a first load coupled to the other end of said first output winding, a second source of spaced energization pulses coupled to one end of said second output winding, a second load coupled to the other end of said second output winding, said first and second sources being respectively of different phases and respectively producing pulse outputs exhibiting excursions from different base potential levels, and circuit means including a diode for selectively coupling control signals to said input winding, said diode being poled to pass said control signals through said input winding to cause said core to assume a certain one of said remanent conditions in response to said control signals thereby to control the passage of pulses from said first and second sources to said first and second loads.

9. The combination of claim 8 including potential clamp means coupled to the other ends of said first and second output windings for clamping said other ends at different potentials corresponding respectively to the different base potential levels of said first and second sources.

10. In combination, a first amplifier having a control input and a direct output, a second amplifier having a signal input, an inhibition input, and a direct output, means coupling control signals to the signal input of said second amplifier thereby to control the output state of said second amplifier, means coupling the output of said second amplifier to the control input of said first amplifier thereby to control the output state of said first amplifier, and means coupling the direct output of said first amplifier to the inhibition input of said second amplifier whereby the output state of said first amplifier cooperates with said control signals to control the output state of said second amplifier.

11. In combination, a magnetic amplifier comprising a core of magnetic material capable of assuming stable remanence conditions, said core having input winding means and output winding means thereon, a first signal source coupled to one end of said input winding means, potential clamp means coupled to the other end of said input winding means, a second signal source coupled to said other end of said winding means for controlling the operation of said potential clamp means, whereby signals from said first and second sources cooperate with one another to control the output signal state of said amplifier at said output winding means, at least one of said first and second signal sources comprising a further magnetic amplifier.

12. In a binary system, the combination comprising a first and a second binary element for producing signals in binary form at their respective outputs, said binary elements being responsive to signals in either binary form at their respective inputs for producing signals in the binary complement form at their respective outputs, means connecting said complement output of each of said elements to said input of each of said others, said second element having a second output and being responsive to signals in either binary form at its input for producing signals in the same binary form at said second output, input means for applying input signals to said first element input, and means connected to said input means and to said second element second output for applying signals in the same binary form as said input signals to said second element input except when the output signal at said second element second output is a certain one of said binary signals.

References Cited in the file of this patent

UNITED STATES PATENTS

| | | |
|---|---|---|
| 2,709,798 | Steagall | May 31, 1955 |
| 2,713,674 | Schmitt | July 19, 1955 |
| 2,713,675 | Schmitt | July 19, 1955 |
| 2,813,207 | Bonn | Nov. 12, 1957 |

FOREIGN PATENTS

| | | |
|---|---|---|
| 721,669 | Great Britain | Jan. 12, 1955 |